(12) United States Patent
Zur et al.

(10) Patent No.: US 9,062,166 B2
(45) Date of Patent: Jun. 23, 2015

(54) CROSS-LINKED POLYOLEFIN FOAMS COMPRISING CORK PARTICLES

(75) Inventors: Baruch Zur, Louisburg, NC (US); Oshri Dadon, Bet Shean (IL); Ehud Nezer, DN. Emek Bet Shean (IL); Benjamin Joshua Reisman, DN Modiin (IL)

(73) Assignee: Palziv Ein Hanatziv Agricultural Co-operative Society Ltd., D.N. Emek Beit Shean (IL)

( * ) Notice: Subject to any disclaimer, the term of this patent is extended or adjusted under 35 U.S.C. 154(b) by 113 days.

(21) Appl. No.: 12/937,689

(22) PCT Filed: Apr. 7, 2009

(86) PCT No.: PCT/IL2009/000401
§ 371 (c)(1),
(2), (4) Date: Jan. 25, 2011

(87) PCT Pub. No.: WO2009/128066
PCT Pub. Date: Oct. 22, 2009

(65) Prior Publication Data
US 2011/0129656 A1  Jun. 2, 2011

Related U.S. Application Data

(60) Provisional application No. 61/071,142, filed on Apr. 15, 2008.

(51) Int. Cl.
*B32B 3/26* (2006.01)
*B32B 3/00* (2006.01)
*C08J 9/00* (2006.01)
*B29C 44/32* (2006.01)
*B29C 44/34* (2006.01)
*B29C 70/66* (2006.01)
*B29K 105/24* (2006.01)
*B29K 711/02* (2006.01)

(52) U.S. Cl.
CPC ............... *C08J 9/0085* (2013.01); *B29C 44/32* (2013.01); *B29C 44/34* (2013.01); *B29C 70/66* (2013.01);*B29K 2105/24* (2013.01); *B29K 2711/02* (2013.01); *C08J 9/0061* (2013.01); *C08J 2201/03* (2013.01); *C08J 2323/00* (2013.01); *C08J 2497/00* (2013.01)

(Continued)

(58) Field of Classification Search
CPC ........ B29C 44/32; B29C 44/34; B29C 70/66; C08J 9/0061; C08J 9/0085; C08J 2497/00; C08J 2201/03; C08J 2323/00; B29K 2105/24; B29K 2711/02
USPC ...................... 428/304.4, 308.4, 314.4, 315.5
See application file for complete search history.

(56) References Cited

U.S. PATENT DOCUMENTS

| | | | |
|---|---|---|---|
| 3,063,091 A * | 11/1962 | Marshall | 528/499 |
| 4,213,925 A | 7/1980 | Kiyono et al. | |
| 4,743,636 A | 5/1988 | Bersano | |
| 5,883,144 A | 3/1999 | Bambara et al. | |
| 6,607,803 B2 | 8/2003 | Foster | |
| 7,150,666 B2 * | 12/2006 | Cheung | 441/74 |

FOREIGN PATENT DOCUMENTS

| | | |
|---|---|---|
| FR | 2 866 591 | 2/2004 |
| GB | 823765 | 11/1959 |
| GB | 1309075 | 3/1973 |
| GB | 1347797 | 2/1974 |
| GB | 1395105 | 5/1975 |
| JP | 60-34680 | 2/1985 |
| JP | 2000-43012 | 2/2000 |
| JP | 2001-213990 | 8/2001 |
| JP | 2004-58557 | 2/2004 |
| WO | WO 2005044536 A2 * | 5/2005 |

* cited by examiner

*Primary Examiner* — Victor Chang
(74) *Attorney, Agent, or Firm* — Greenberg Traurig, LLP

(57) ABSTRACT

The present invention provides a sheet of polymeric foam comprising chemically cross-linked, closed-cell, foam comprising at least one polyolefin; cork particles dispersed within said polymeric foam wherein said foam has a specific gravity of between 40-250 kg/m3 and is essentially free of visible perforations. Also provided by the present invention is a process for producing a continuous polymeric sheet said comprising a chemically cross-linked, closed-cell, polyolefin foam comprising at least one polyolefin and cork particles, homogenously dispersed within the polyolefin foam wherein once produced, said continuous polymeric sheet has a specific gravity of between 40-250 kg/m3 and is essentially free of visible perforations; the process comprising (i) continuously feeding into a mixing arrangement set at a temperature of between 60 C and 200 C a blend of at least one polyolefin resin, a blowing agent, a cross-linking agent and cork particles, to form therein a homogenous melt; (ii) transferring said melt into an extrusion line constructed to form a continuous sheet of said melt; (iii) conveying the continuous sheet into a heating module for heating said continuous sheet to a first temperature allowing cross-linking of said at least one polyolefin resin to obtain a cross-linked polyolefin sheet, said first temperature being lower than that required for activating said blowing agent; and (iv) heating the cross-linked polyolefin sheet to a second temperature allowing activation of said blowing agent, to obtain said continuous polymeric foam.

9 Claims, 5 Drawing Sheets

CROSS-LINKED POLYOLEFIN FOAMS COMPRISING CORK PARTICLES

FIELD OF THE INVENTION

This invention generally relates to polymeric foams and in particular to polyolefin-based foams.

BACKGROUND OF THE INVENTION

Crosslinked polyolefin foams are produced commercially worldwide, playing a part in numerous industries. They can be found for example in sports and leisure products, in military applications, in vehicles, such as ships and boats and in the home.

Although naturally occurring polymer foams have been known for a long time, (e.g., sponges, cork), synthetic polymer foams have only been introduced to the market over the last 3 decades.

The production of cross-linked polyolefin foams involves the cross linking followed by foaming. In the cross linking step covalent bonds are formed between the polymer creating a three dimensional macroscopic matrix, which provides the material both physical and chemical strength and robustness. In the foaming step, a blowing agent is activated to release gas which is entrapped within the cell units of the matrix, thus forming small "air bubbles".

Electron beam, silane grafting and peroxides are the main three techniques used for crosslinking of polyolefin foams. Typically, for electron beam irradiation, an extruded polymer sheet containing the chemical foaming (blowing) agent is subjected to intense electron beam energy which serves to dehydrogenate the polymer, an action that results in crosslinking. The polymer is heated further to activate the foaming agent. For chemically crosslinked polymers (e.g. polyolefins), the crosslinking agent, usually peroxide, is compounded into the polymer along with the foaming agent. The extruded polymer sheet temperature is sufficient to crosslink the polymer but not to activate the foaming agent. After most of the crosslinking is completed, the polymer sheet is heated further to activate the foaming agents. An organosilane and a free radical generating compound reacted with a polyolefin forms a silane grafted polyolefin that when mixed with a silanol condensation catalyst and heated, creates a silane crosslinked polyolefin. This crosslinked polyolefin can then be subsequently foamed using a conventional chemical blowing agent that has been previously compounded into the sheet.

The combination of naturally occurring polymer foams and synthetic polymer foams has also been suggested. The physical properties of cork, a natural polymeric foam, was already appreciated by ancient Egyptians who used cork to prepare fishing boats, taking advantage of the fact that a significant amount of a cell unit of cork (usually more than half) consists of air, this made cork one of the lightest substances available at the time. In addition to its lightness, cork is a material exhibiting excellent compressibility, resilience, moisture resistance, high friction resistance, and other advantageous qualities.

Cork is utilized as a raw material for the production of a variety of products including as an ecological insulator in constructions, in sheets with vibration absorbance to be used e.g. in machinery, in soles (in footwear), in stationery, leatherwear, packing, floor covering (laminates) and stoppers for wine bottles.

In one aspect, cork is used as an additive filler particle in the production of utility polymers. Since the cork particles are chemically inert in a cross linking reaction, they may act as nucleating agents, and thereby tend to promote formation of air bubbles. The cork particles are added in the form of powder, pellets, granules or chips which may be of regular or irregular shape.

Examples for the various utilizations of cork are described in the following publications: in GB 1347797 ground cork is suggested as an additive to a cushioning polymer. In FR 2866591 sheet material is made from particles of a granulated material, including cork, coated with a bonding agent of a polymer, rubber or other material that can be vulcanized. In JP 2004058557 cork grains are added to a mixture of polyamide fibers, a polymer and charcoal powder to form a flexible sheet; In JP 2000043012 cork sheet is provided comprising cork powder and an olefin copolymer; In JP 60034680 floor covering is described comprising cork powder mixed with crosslinkable rubber or thermoplastic rubber like polymer; in GB823765 a resilient material for the manufacture of pads and supports are prepared by calendering into sheet form, and subsequently vulcanizing, a mix containing particles or granules of, inter alia, cork, and a bonding medium, such as synthetic or natural rubber; In JP 2001213990 there is described a copolymer of ethylene and $C_{3-12}$ α-olefin mixed with up to 10% w/w cork powder providing particles In U.S. Pat. No. 4,743,636 there is provided a condensed (non-foam) polymer based on low density PE (LDPE) and linear LDPE which are mixed with filler particles, including cork particles in order to make a sealing compound.

SUMMARY OF THE INVENTION

In accordance with a first aspect, the present disclosure provides a sheet of polymeric foam comprising: (a) chemically cross-linked, closed-cell, foam comprising at least one polyolefin; (b) cork particles dispersed within said polymeric foam; wherein said foam has a specific gravity of between 40-250 kg/m³ and is essentially free of visible perforations.

In accordance with a second aspect, the present disclosure provides a process for producing a continuous polymeric sheet comprising (a) chemically cross-linked, closed-cell, polyolefin foam comprising at least one polyolefin; and (b) cork particles, homogenously dispersed within the polyolefin foam; wherein once produced, said polymeric sheet has a specific gravity of between 40-250 kg/m³ and is essentially free of visible perforations;

the process comprises:

i) continuously feeding into a mixing arrangement set at a temperature of between 60° C. and 200° C. a blend of at least one polyolefin resin, a blowing agent, a cross-linking agent and cork particles, to form therein a homogenous melt;

ii) transferring said melt into an extrusion line constructed to form a continuous sheet of said melt;

iii) conveying the continuous sheet into a heating module for heating said continuous sheet to a first temperature allowing cross-linking of said at least one polyolefin resin to obtain a cross-linked polyolefin sheet, said first temperature being lower than that required for activating said blowing agent;

iv) heating the cross-linked polyolefin sheet to a second temperature allowing activation of said blowing agent, to obtain said continuous polymeric.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF SOME EXEMPLARY EMBODIMENTS

Figure 1:
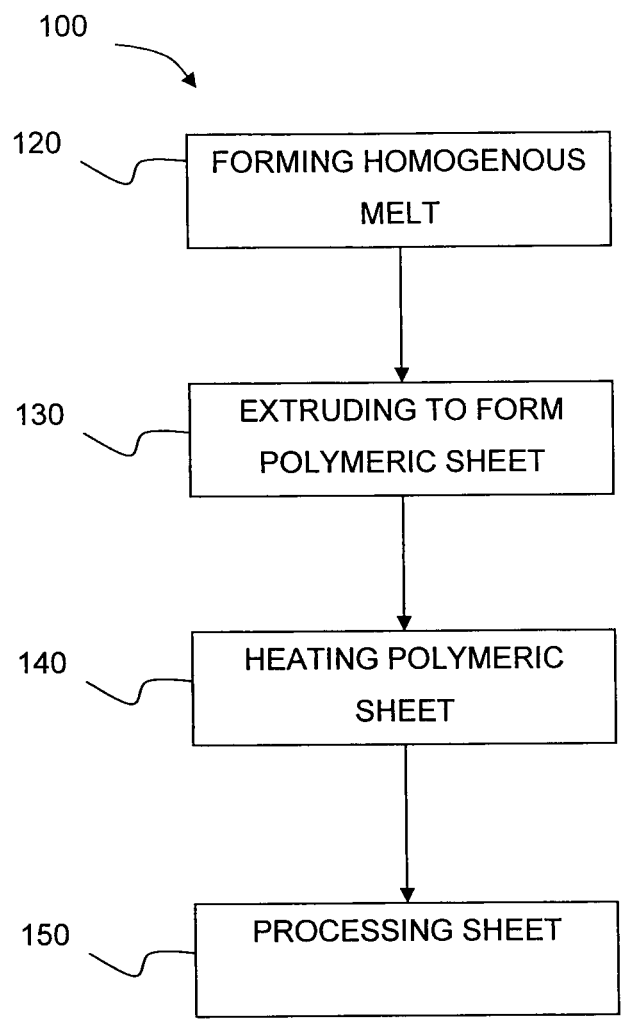
FIG. 1 is a schematic flow diagram illustrating the main steps for performing the process in accordance with the broadest aspect of the present disclosure.

The present invention concerns the development of polyolefin polymeric foams comprising, embedded within the polymeric matrix, cork particles. As may be appreciated by those versed in the art of polymeric foams, synthetic polymeric foams having dispersed therein natural polymeric particles, may have various advantages, especially when the use and appearance of products comprising natural material is desirable.

Thus, in accordance with a first of its aspects, there is disclosed herein a polymeric foam comprising:

(a) chemically crosslinked, closed-cell, foam comprising at least one polyolefin;

(b) cork particles dispersed within the polyolefin foam;

wherein said foam has a specific gravity of between 40-250 kg/m$^3$ and is essentially free of visible perforations As used in the specification and claims, the forms "a", "an" and "the" include singular as well as plural references unless the context clearly dictates otherwise. For example, the term "a polyolefin" includes one or more polyolefin resins, and the term "polyolefins" includes one polyolefin resin as well as more than one type of polyolefin resin.

As used herein, the term "or" means one or a combination of two or more of the listed choices.

Further, as used herein, the term "comprising" is intended to mean that the polymeric foam and processes disclosed herein include the recited elements, but does not exclude others. For example, when referring to foam comprising a chemically cross-linked polyolefin and cork particles, the foam may as well include other additives, such as a dye. Similarly, "consisting essentially of" is used to define foams and processes that include the recited elements but exclude other elements that may have an essential significance on the functionality of the resulting sheet. For example, a foam consisting essentially of cross-linked polyolefin and cork particles will not include or will include only insignificant amounts (amounts that will have an insignificant effect on physical properties of the foam) of other elements. "Consisting of" shall mean excluding more than trace amounts of other elements. Embodiments defined by each of these transition terms are within the scope disclosed herein.

Further, all numerical values, e.g., concentration or parts per hundred parts resin (PHR) or ranges thereof, are approximations which are varied (+) or (−) by up to 20%, at times by up to 10%, from the stated values. It is to be understood, even if not always explicitly stated that all numerical designations are preceded by the term "about". It also is to be understood, although not always explicitly stated, that the reagents described herein are merely exemplary and that equivalents of such are known in the art.

The term "chemically crosslinked" in the context of the present disclosure is used to denote that the polymer chains forming the foam are inter-connected by a plurality of covalent bonds and that the covalent bonds are stable mechanically and thermally. The term "chemically crosslinked" is used to distinguish the present disclosure from other possible forms of cross-linked polymers, including physical crosslinking. The crosslinking in accordance with the present invention may result in the formation of homo-polymers as well as co-polymers.

The polymeric foam according to the present disclosure comprises closed-cell polyolefin foam. The term "closed cell", in contrast to "open cell", is known to a skilled person and means that essentially all cell walls of the foam are undamaged. Preferably, at least 90% of the cells have undamaged cell walls, more preferably at least 95%, even more preferably more than 98%.

In accordance with an embodiment of the invention, the closed cell's average diameter is between 50 μm and 5000 μm, preferably between 500 μm and 3500 μm, even more preferably between 750 μm and 2500 μm.

The polymeric foam comprises at least one polyolefin. As appreciated by those versed in chemistry, "polyolefins" are a class of organic substances prepared by the addition polymerization of alkene (hydrocarbons containing at least one carbon-carbon double bond per molecule), especially ethylene and propylene. The polymeric foam of the present invention can employ one or more polyolefins, and the one or more polyolefins may be combined with one or more other polymers.

In accordance with one embodiment disclosed herein, the polyolefin forming part of the polymeric foam is characterized by a melt index of the raw material, namely, the polymer in its form prior to being chemically cross-linked with the same or another polymer, of between 0.3 and 20, preferably between 0.7 and 5.

The polyolefin may be a homopolymer or a copolymer of any $C_2$ to $C_{20}$ olefin. In accordance with one embodiment, the polyolefin is a copolymer of ethylene and an alpha-olefin selected from of iso-propene, butene, iso-pentene, hexane, iso-heptene and octane.

There are a variety of polyolefins which exhibit the above melt index and thus may be used to form the polymeric foam disclosed herein. A non-limiting list of possible polyolefins comprises high density polyethylene (HDPE), Medium density PE (MDPE), low density PE (LDPE), linear low density PE (LLDPE), Metallocene PE, Poly-1,2-butadiene, ethylene propylene copolymer, ethylene butane copolymer, ethylene vinyl acetate (EVA) polymers, copolymers of ethylene with up to 45% of methyl, ethyl, propyl or butyl acrylates or methacrylates, chlorinated products of the above homopolymers or copolymers having chlorine content of up to 60% by weight and mixtures of two or more of the above mentioned polymers.

Polyolefins for chemical cross-linking to form polymeric foams are readily available in the market. For example, polyolefins may be purchased from Carmel Olefins, ExxonMobil, Borealis, Dow, Dupont, Equistar, Mitsui Chemicals, Sabic etc.

According to one preferred embodiment, the at least one polyolefin is LDPE with a melt index of 0.7-4.

The polymeric foam disclosed herein comprises cork particles. As appreciated by those versed in the art, cork is a unique material in that it is made of air-filled, watertight cells which make the cork an effective, light in weight, insulating medium.

The term "cork particles" denotes naturally occurring as well as recycled cork The cork particles may have a common, regular shape, although preferably have irregular shapes. The irregular shape may be obtained by the chopping or dicing of larger cork pieces to form cork chips, pellets, granules etc.

The advantages of using cork particles have already been appreciated. Cork may function as an ecological insulator in constructions e.g. underlayments, for cushioning, e.g. to form sheets with vibration absorbance to be used e.g. in machinery, or in soles (in footwear), or in packing etc.

In accordance with one embodiment, the cork particles have an average diameter of between about 100 μm and 3000 μm, preferably between 500 μm and 2000 μm Cork material is readily available in the market and can be purchased, for example from Bet Hashaum/Amorim group.

In accordance with an embodiment, the cork particles constitute between about 0.1 to about 25 parts per hundred parts (PHR), or preferably 1-15 PHR or even more preferably 2.5-10 PHR, of the total amount of polyolefins present in the polymeric foam.

The polymeric foam is essentially free of visible perforations. It is well appreciated by those versed in the art, that porous foams having cracks, holes or any other form of perforation would derogate the quality of the foam in terms of sealing and moisture barrier, when the latter is required.

Without being bound by theory, it is believe that the lack of visible perforations is obtained as a result of the a priori homogenous melt formation comprising the raw materials before introducing the raw materials into an extrusion line. This gentle mixing of the raw material together with the cork particles from which the homogenous melt is formed, allows the formation of intimate interaction between the polymeric material and the cork particles prior to foaming, and thus, when foamed, a sort of intra-penetrating network is formed with cork particles carefully embodied and trapped within the network of polyolefin foam.

The term "essentially free of visible perforations" is intended to denote that a person versed in the art of polymeric foams, using merely his eye vision (namely, without the use of magnifying equipment), will not detect significant defects, such as perforations, cracks or holes in more than 0.1% per surface area (e.g. 1 cm$^2$/1 m$^2$) of the foam when in the form of a sheet, and more preferably, not at all.

The polymeric foam disclosed herein has the advantage that it may be produced as a continuous sheet, without exhibiting the aforementioned perforations and other defects typically encountered when attempting to manufacture continuous sheets of polymeric foam. The polymeric sheet is producible at a thickness of between 2 mm-20 mm and at any length above 2 m.

In addition to the above-mentioned characteristics, the cork containing polymeric sheet disclosed herein may be characterized by one or more of the following properties:
- it has a compression set under constant force in air of between 5 and 50% measured after 24 hrs;
- it has a tensile strength of between 100 and 10000 KPA
- it has an elongation at break of between 30 and 500%
- it has a compressive stress (deflection at 25%) of between 20 and 2000 kPa
- it has a compressive stress (deflection at 50%) of between 50 and 4000 kPa The polymeric sheet disclosed herein may comprise additives typically used in polymer industry. Such additives may include, with out being limited thereto, one or more of a dye, such as a color masterbatch; a stiffener, such as HDPE; a softener such as EVA; an antioxidant such as BHT; an anti-fungal such as nano silver particles; an anti-static such as GMS; an ultra violet resistant additive, such as HDPE; an inorganic filler, such as Calcium Carbonate; an organic filler, such as Corn starch; a chemical blowing agent (an agent that alone or in combination with other substances is capable of producing a cellular structure in a matter) such as azodicarbonamide; a co-activator of the chemical blowing agent (catalyst or activator of the foaming agents to lower temperatures) such as zinc oxide; a metallocene polyolefin, such as Engage; a conducting agent, such as Conductive carbon black, a halogenated flame retardant agent, such as dibromodiphenyl ether or a non halogenated flame retardant such as magnesium hydroxide.

The polymeric sheet disclosed herein may have various applications.

In accordance with one embodiment, the cork comprising polyolefin based foam disclosed herein may be used as underlayment of, e.g. wood floors, as described, for example, in U.S. Pat. No. 6,607,803, incorporated herein by reference in its entirety.

In addition, the cork comprising polyolefin based foam disclosed herein may be used for Ballast mats in Railway track applications that lower vibration and sound development, midsoles in shoe manufacture, acoustic and heat insulation panels in automotive applications, fashion accessories (bags, belts etc.), Office notice boards etc.

Reference is now made to FIG. 1 which provides a schematic block diagram 100 of the main steps for manufacturing a continuous sheet comprising the polymeric foam described above. It is noted that while FIG. 1 is described as a step-wise process, the process is not a batch process, but rather a continuous process, where each step is continuously operated, thereby allowing the formation of a continuous sheet.

Firstly, in Step 120 starting (raw) materials comprising at least one polyolefin resin, cork particles, at least one cross-linking agent and at least one blowing agent are continuously fed into a mixing arrangement set at a temperature of between 60° C. and 200° C. to form a homogeneous molten blend (at times referred to by the term "homogenous melt").

The homogenous melt is fed into an extrusion line (Step 130) constructed to form from said homogenous melt a continuous polymeric sheet. The continuous polymeric sheet is then transferred into a heating module (Step 140) for heating the continuous sheet to a first temperature at which cross-linking of the at least one polyolefin resin is performed, albeit being lower than the temperature required for activating the blowing agent. As a result, a cross-linked polyolefin sheet is obtained. Step 140 also comprises elevating the temperature within the heating module, thereby further heating the cross-linked polyolefin sheet to a second temperature at which the blowing agent present in the melt is activated. As a result, a continuous polymeric sheet of cross-linked polyolefin foam comprising cork particles homogenously dispersed therein is obtained. Finally, the continuous polymeric sheet of cork embedded, cross-linked polyolefin foam is processed for storage (Step 150). Processing may include rolling the continuous sheet, cutting from the continuous sheet pre-designed blocks etc.

In accordance with a preferred embodiment, in Step 120 the raw material comprises also one or more additives selected from a dye, a stiffener, a softener, a plasticizer, an antioxidant, an anti-fungal, an anti-static, an ultra violet resistant additive, an inorganic filler, an organic filler, a chemical blowing agent kicker, a metallocene, a conducting agent, and a flame retardant agent, as will be further discussed below.

In Step 120 the raw materials are mixed at a temperature of between about 60° C. and about 200° C. and more specifically, from about 80° C. to about 150° C., so as to allow the formation of a molten blend in which the cork particles are homogenously dispersed in the blend.

The homogenous melt may be obtained by using a variety of mixers known in the polymer industry. Some exemplary, non-limiting mixers include a Banbury mixer, a dispersion mixer, a batch mixer, an internal Mixer, a kneader and others.

As appreciated by those versed in the art, mixing in the mixer may take from about several seconds to about several minutes until the homogenous molten blend is obtained. Once ready, the homogenous melt obtained from Step 120 is transferred, in Step 130, via, e.g. a feed hopper, into an extrusion line.

A typical extrusion line may consist of the raw material feed hopper, a single extruder or a combination of extruders connected in a series, an extrusion die, a calibration unit, and haul-off. The extruders typically comprise a heated barrel containing therein a single or plurality of rotating screws. The extrusion line may include a single extruder or combinations of extruders which may be any one of the extruders known in the polymer industry, including, without being limited thereto, single screw extruder, tapered twin extruder, tapered twin single extruder, twin screw extruder, multi-screw extruder. The extrusion line may also comprise a sheet pre-forming machine. The melt moves from the back of the screw to the head of extrusion die channel in which the melt is simultaneously heated, mixed and pressurized to take up an approximate shape of a sheet.

As appreciated by those versed in the art, the extruder or series of extruders has the following basic functions: it compresses the melt while at the same time allowing removal of volatile gases (optionally removed by vacuum), it softens the melt by heating it (both from internally generated shear forces and additional externally applied heat, if used), it mixes the melt and produces a homogenous melt without impurities, it meters the melt into the die area, and it applies a constant pressure required to force the melt through the die.

The die may be any type of die known in the art, including, without being limited thereto, T-die, strand die, Flat die/Coathanger die etc. The die output may then be transferred into Calender rolls for smoothing the surface of the polymeric sheet and pressing it to obtain a substantially precise uniform thickness throughout the polymeric sheet.

It is noted that since the melt is continuously fed from the hopper into the extruder a continuous sheet of a uniform thickness exits the calender.

The continuous sheet is transferred to a heating arrangement (Step 140) comprising a cross-linking module (not shown in FIG. 1) in which the chemical cross-linking is completed followed by a blowing module (not shown in FIG. 1) in which the chemically cross-linked polymer is blown to form the polymeric foam.

The cross-linking module comprises a conveyer oven adapted to heat the continuous sheet to a first temperature which permits being lower than that required for activating the blowing agent, if included a priori in the raw blend.

According to one embodiment, the conveyer oven is a horizontal oven having a length of 20-50 m. The oven is equipped with a moving belt (e.g. stainless steel belt) which slowly transports the sheet at a temperature range which induces either cross-linking or blowing or both (in two distinct sections). According to one embodiment, the temperature range (the said first temperature) is between about 70° C. and about 160° C. so as to activate and induce cross-linking. It is noted that the oven can have a fixed temperature or a temperature gradient. The belt transports the sheet at a speed that is variable and is determined upon by the density and thickness of the foam to be produced A variety of cross-linking agents may be included in the melt, so as to allow cross-linking of the at least one polyolefin in the melt. Typically used to this end are peroxides (compounds containing an oxygen-oxygen single bond). A non-limiting list of peroxide-based cross-linking agents comprises dicumyl peroxide, di-t-butyl peroxide, 2,5-dimethyl-2, 5-di(t-butylperoxy)hexane, 2,5-dimethyl-2,5-di(t-butylperoxy)hexyne-3,1,3-bis(t-butylperoxyisopropyl) benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide and t-butyl cumyl peroxide.

A preferred peroxide based cross-linking agent in accordance with the present disclosure is dicumyl peroxide The cross-linking agent may also be an organosilane linker coupled with a silanol condensation catalyst. The one step "Monosil" process can be used or alternatively the two step "Sioplas" technology. For those knowledgeable in the art, either method can be utilized to produce Silane crosslinked Polyolefin foams.

The blowing module may constitute a second conveyer oven or a second portion of the conveyer in which cross-linking has occurred. The blowing module is adapted to heat the continuous, cross-linked, sheet to a second temperature which permits being higher than that required for cross-linking. The second temperature, according to one embodiment is between about 150° C. and 250° C.

The term "blowing agent" is known in the art and refers to any substance which alone or in combination with other substances is capable of producing a cellular structure in a polymeric or other material. Blowing agents may include compressed gases that expand when pressure is released, soluble solids that leave pores when leached out, liquids that develop cells when they change to gases, and chemical agents that decompose or react under the influence of heat to form a gas. Chemical blowing agents range from simple salts such as ammonium or sodium bicarbonate to complex nitrogen releasing agents. Blowing agents can be endothermic or exothermic.

In accordance with a preferred embodiment of the invention, the blowing agent is a chemical blowing agent. A non-limiting list of blowing agents comprise azodicarbonamide, barium azodicarboxylate, azobisisobutyronitrile, and azodicarboxylic amide, nitroso compounds, such as N,N'-dinitrosopentamethylenetetramine, N,N'-dimethyl-N,N'-dinitrosoterephthalamide, and trinitrotrimethyltriamine, hydrazide compounds, such as 4,4'-oxybis(benzenesulfonylhydrazide), paratoluene sulfonylhydrazide, diphenylsulfone-3,3'-disulfonylhydrazide, and allylbis(sulfonylhydrazide), semicarbazide compounds, such as p-toluilene sulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole.

A preferred blowing agent in accordance with the present disclosure is azodicarbonamide.

It is to be appreciated by those versed in the art that the cross-linking and blowing may take place in two distinguished conveyer ovens, as well as in a single conveyer over, having a first section being heated to the first temperature where cross-linking takes place up to completion, either as a fixed temperature or as a gradient and a second section receiving the cross-linked polymer, and having a second temperature, either as a fixed temperature or as a gradient, where the blowing agent is activated and foaming of the cross-linked sheet takes place.

The temperatures in the two different ovens or in the two sections of a single oven and the transport velocity of the transporting belts are adjusted, so that the cross-liking process is substantially complete before the blowing process takes place.

According to one embodiment, the cross-linking temperatures are in the region of 120° C.-150° C. During the cross-linking stage, the polymer sheet is melted, crosslinked and the melt strength goes up enough so that when, towards the end of the oven (or the first section), the temperatures are raised up to over 200° C. (typically in the range of 220° C.-250° C.), the foaming occurs and the material comes out of the oven as a foam sheet.

After formation of the foam (namely, after blowing is completed) the continuous sheet is cooled and processed for storage (e.g. rolling, cutting etc.) (Step 150). According to one embodiment, cooling is achieved using a sheet Haul-off (Winder) system. A sheet Haul-off system may comprise two main sections. A first cooling section and a second Winding section. According to another embodiment, cooling may be achieved by water chilling. It is preferable that cooling is performed as quickly as possible, to a temperature below 100° C. As soon as the foam is cooled enough, it is wound.

The continuous rolled sheet may be aged for a sufficient period of time for optimal annealing and relaxation before performing further processing such as welding, laminating of materials etc. as further described below with reference to the different applications of the continuous rolled sheet. It is noted that instead of rolling, the continuous polymeric foamed sheet exiting the conveying oven may be cooled and sliced into blocks of fixed length for storage.

A variety of combinations of raw materials may be used to form the continuous sheet of cork-embedded, chemically cross-linked polymeric foam in accordance with the present disclosure.

In accordance with one embodiment, the raw materials comprise a mixture of at least one polyolefin resin, 0.1-25 parts by weight per hundred parts (PHR) (preferably 1-15, more preferable 2.5-10) of cork particles, 0.2-25 PHR (preferably 2-20, more preferable, 5-15) of chemical blowing agent blowing agent, 0.1-2 PHR (preferably 0.4-1.2) of a cross-linking agent, and 0-3 PHR (preferably 0.1-1) of a dye (color Masterbatch would be better).

In a preferred embodiment, the raw materials comprise 2.5-10 PHR cork particles.

In accordance with the same or other preferred embodiments, the raw materials may comprise 5-15 PHR of chemical blowing agent.

In accordance with yet the same or other preferred embodiments, the raw materials may comprise 0.4-1.2 PHR of a cross-linking agent.

It is noted that while the above example (referring to FIG. 1) includes the addition of cross-linking agent and a blowing agent, the cross-linking as well as the blowing so as to form a crosslinked polyolefin foam may be achieved without the said cross-linking agent and/or blowing agent. For example, cross-linking and blowing may be obtained physically as described by Alveo or by Zotefoams, respectively.

Reference is now made to FIGS. 2A-2D which are schematic illustrations of alternative steps for performing the process for producing a chemically cross-linked polyolefin based foam with cork particles homogenously dispersed therein. For simplicity, like reference numerals to those used in FIG. 1, shifted by 100 are used to identify components having a similar function in FIGS. 2A-2D. For example, Step 120 in FIG. 1, which relates to the formation of a melt, is referred to as Step 220 in FIG. 2A, 320 in FIG. 2B, 420 in FIG. 2D and so forth.

Figure 2A:
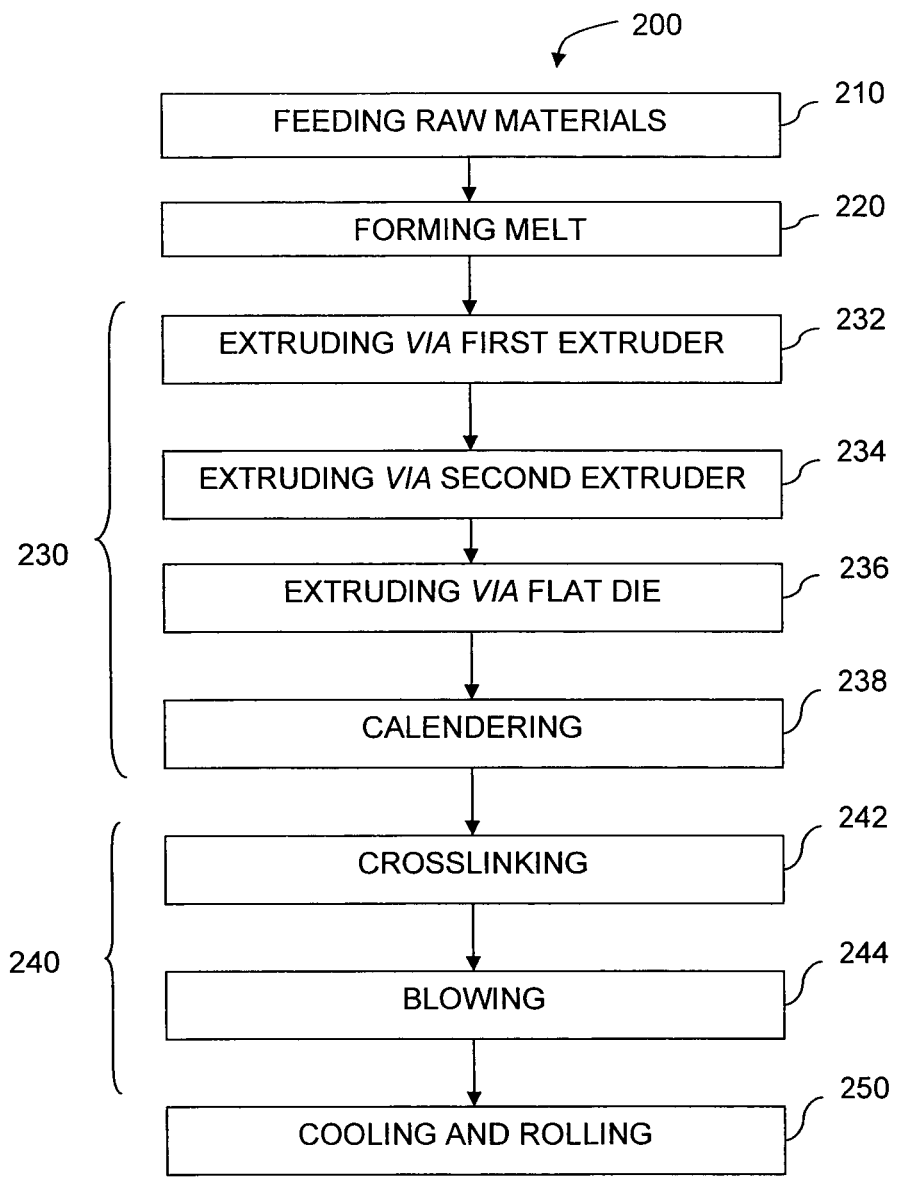
FIGS. 2A-2D are schematic flow diagrams illustrating alternative, more specific steps of the process disclosed in FIG. 1.

Specifically, FIG. 2A illustrates a process 200 where firstly the mixture of raw materials comprising at minimum at least one polyolefin resin, cork particles, a cross-linking agent and a blowing agent is fed into a mixer (Step 210). The mixer may be any commercial mixer available in the industry, some examples of same provided hereinabove.

The mixer (210) includes, in addition to the at least one polyolefin, the cork particles, the blowing agent and a radical generator such as a peroxide.

The mixer is also configured to convey heat at a temperature of between about 80° C. to and about 150° C. Thus, while being continuously mixed, the raw materials melts (Step 220) until they are homogenized into a molten blend.

Once an essentially homogeneous melt is obtained and the temperature of the melt and the mixer inner chamber are essentially the same (although these criteria may vary, depending on the raw materials used), the melt is transferred (fed) into an extrusion line comprising a series of extruders in fluid communication. Accordingly, the homogeneous melt is firstly pressed into the inlet of a $1^{st}$ extruder, being in this particular embodiment a tapered twin screw extruder (Step 232), is set to exert heat onto the melt received and contained therein at a temperature of between about 80° C. to about 200° C.

The molten blend is then extruded via the outlet of the tapered twin screw extruder directly into the inlet of a $2^{nd}$ extruder, in this particular embodiment, a single screw extruder (Step 234) the outlet of which is connected to the inlet of a flat die (Step 236). The molten blend extruded through the flat die is in the form of a continuous sheet.

The continuous sheet is then continuously fed into a triple roll calender (Step 238). A calendar is known to smooth surfaces of sheets transferred there through and provide sheets with a uniform, pre-determined thickness.

Figure 2B:
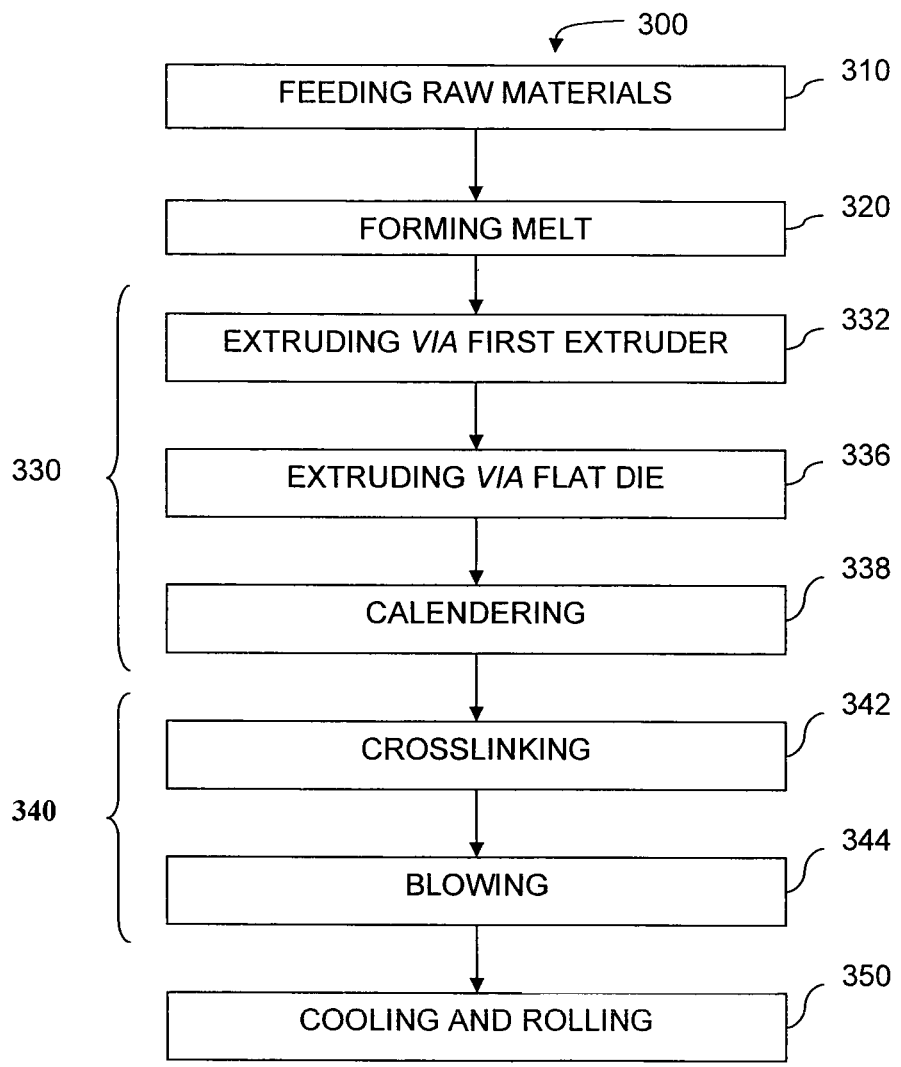

The uniformly produced continuous sheet exiting the calendar is transferred to a conveyer oven (Step 240) having a first section (Step 242) which is set at a temperature sufficient for completing crosslinking of the polymers in the continuous sheet, and following in line, a second section (Step 244), which is set at a temperature sufficient for activating the blowing agent and blowing the received, chemically cross-linked polymeric sheet, to obtain the respective foamed sheet which is then cooled and processed for storage (Step 250). According to this embodiment, cooling is achieved on chiller rolls and the cooled continuous sheet is then wound on a core Reference is now made to FIG. 2B which illustrates a process 300, with essentially the same steps as illustrated in FIG. 2A, with the main difference that the process illustrated in FIG. 2B is missing in the respective Step 234 the use of a single screw extruder just after the tapered twin screw extruder. In other words, the essentially homogeneous melt existing the mixer is fed into an extrusion line comprising a tapered twin single extruder (Step 332), set to exert heat onto the molten received and contained therein at a temperature of between about 80° C. to about 200° C. The resulting blend is then directly fed into the inlet of a flat die (Step 336).

Figure 2C:
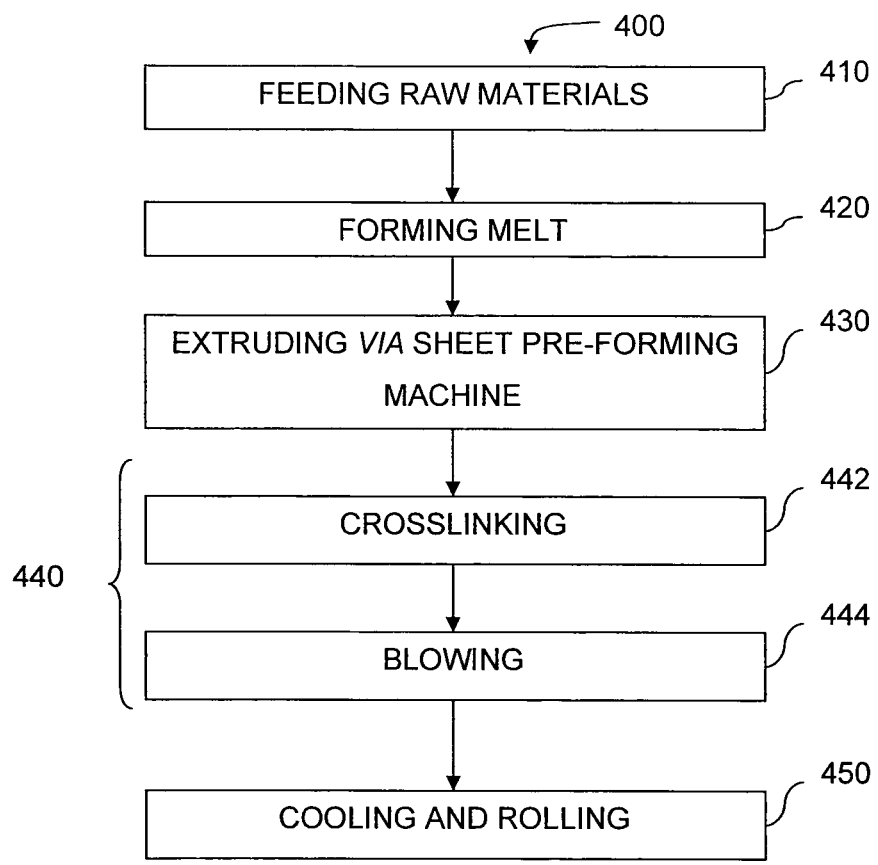

Reference is now made to FIG. 2C which illustrates a process 400, with essentially the same steps as illustrated in FIG. 2A, albeit with the difference that a sheet pre-forming machine is utilized in Step 430 to form a sheet of uniform thickness. Sheet pre-forming machines are well known in the art, and as an example, a sheet pre-forming machine as described by Moriyama Company Ltd. may be employed [http://www.ms-moriyama.co.jp/english/products/ e_sheet_index.html]. The sheet pre-forming machine is comprised essentially of a tapered twin screw connected to mixer rolls. According to this particular embodiment, homogenized melt received from the mixer (from Step 420) is introduced initially into the tapered twin screw, set at a temperature of between about 80° C.-200° C., from which the melt is transferred into the mixer rolls to produce the polymeric sheet ready for heating (Step 440) and processing (Step 450).

Figure 2D:
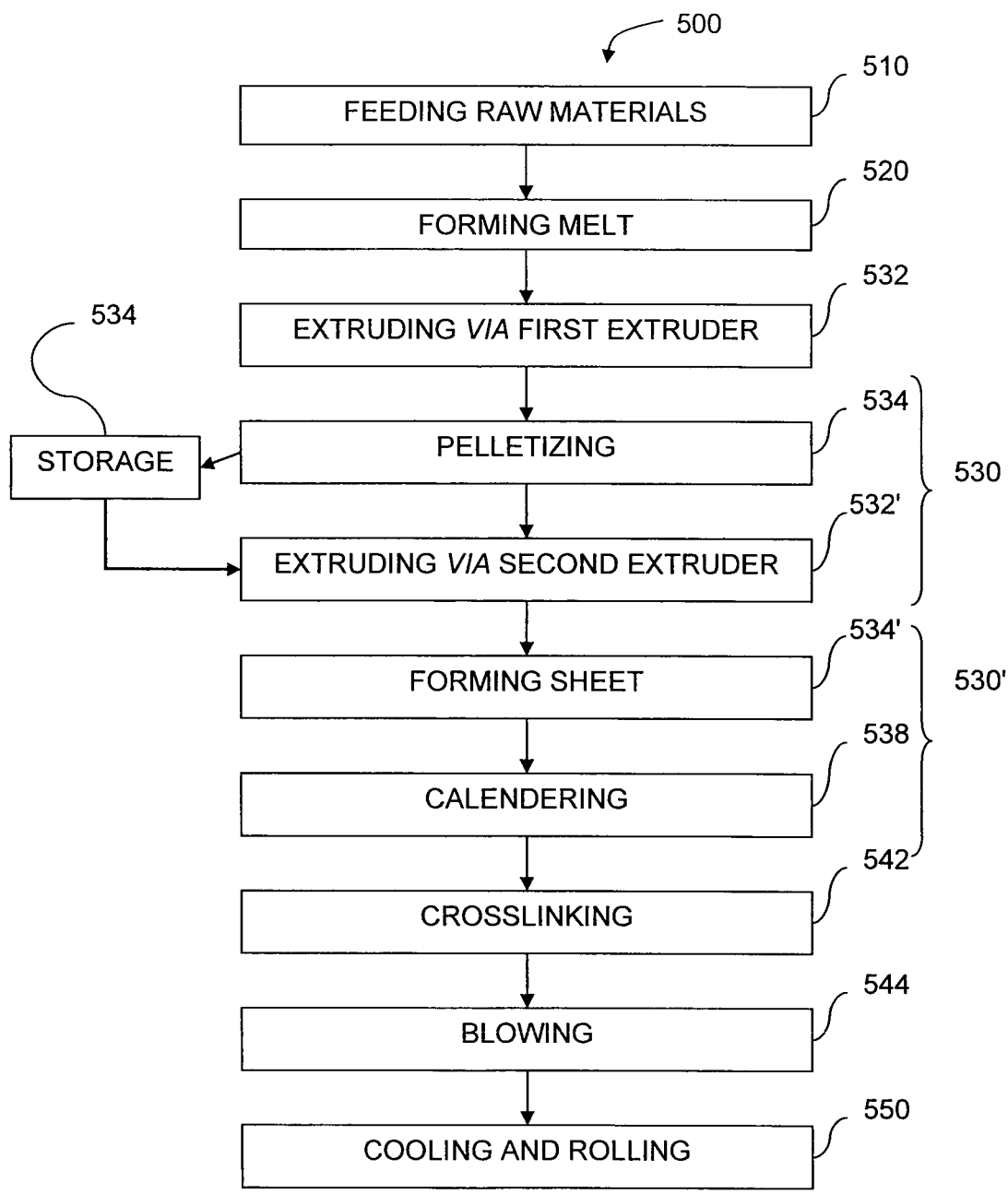

Reference is now made to FIG. 2D which schematically illustrates a process 500 similar to the process of FIG. 2A, however, comprising an extrusion line which allows the formation of pellets from the homogenous melt. Specifically, following the formation of a melt comprising a homogeneous mixture of the raw materials (Steps 510, 520), the melt is extruded in a first extrusion line (Step 532) comprising a 1$^{st}$ extruder (Step 532), connected via its outlet to a pelletizing die allowing the formation of pellets comprising the homogenously mixed raw materials (Step 534). In this particular embodiment the first extrusion line comprises, respectively, a tapered twin single extruder (or into a combination in line of a tapered twin screw extruder followed by a single screw extruder) and "strands" forming die. The thus formed pellets may then be collected and stored (Step 560) for future return into the process (Step 570), or directly fed into a second extrusion line (Step 530'). In the second extrusion line, comprising a 2$^{nd}$ extruder connected in line to a die, the pellets are received and thereby extruded to obtain thereby a sheet of uniform thickness (Steps 532' and 534'). In this specific embodiment, the pellets are fed into a single or twin screw extruder (Step 532') followed by extrusion via a flat die (Step 534') for forming the sheet. The sheet is then further processed through a calendar and so forth, as detailed in connection with FIG. 2A, until the continuous sheet of chemically cross-linked polymeric foam is obtained.

Although the present disclosure has been described in conjunction with specific embodiments thereof, it is evident that many alternatives, modifications and variations will be apparent to those skilled in the art.

The invention will now be described with reference to the following non-limiting example.

Non-Limiting Specific Example

Preparation and Characterization of Cork-Embedded Chemically Cross-Linked, Foamed Polyolefin Sheet Four continuous cross-linked polyethylene foams comprising 2.5, 4, 5 or 10 PHR by weight cork particles were prepared in accordance with the method illustrated in FIG. 2A, from raw materials comprising:

LD 322, Low Density Polyethylene resin obtained from Carmel Olefins, Haifa Bay, Israel.
1 PHR of Perkadox BC-FF obtained from AKZO NOBEL
20 PHR of UNIFOAM AZ VI-50 Azodicarbonamide obtained from HEBRON-OTZUKA Chemicals; and
2.5 PHR, 4 PHR, 5 PHR, or 10 PHR of natural cork particles obtained from Beit Hasha'am, an agent of Amorim.
1% Brown Masterbatch obtained from Tosaf Compounds.

The mixture of raw materials was fed into a Banbury mixer heated to a temperature of about 150° C., thereby forming a molten blend of the raw materials. Via a hopper, the melt was fed into an extrusion line as described above and via a coathanger die to produce a polymeric sheet. This preliminary sheet was directly transferred via a 3 rolls calendar to form a polymeric sheet of uniform thickness 2 mm.

The continuous sheet was conveyed into a conveyer oven consisting of a first temperature section adapted to radiate heat at a temperature of 150° C. (being the temperature for activating the Dicumyl Peroxide followed by a second temperature section adapted to radiate heat at a temperature of 230° C. (being the temperature for activating the Azodicarbonamide. As a result of this double stage heating of the sheet, a cork containing, cross-linked polyethylene foam is obtained.

Finally, the sheet of cross-linked polyethylene foam exiting the conveyer oven was cooled using water chiller chromed rolls and rolled on a winder system.

Table 1 presents averaged mechanical parameters of samples taken from the four continuous cross-linked polyethylene foams comprising 2.5, 4, 5 and 10 PHR cork particles produced as described above.

Specifically, three to five samples were cut off strips of 1.5×1.5 m$^2$ which were taken from a 200 m long sheet of the produced foams.

The transverse and longitudinal tensile strengths were measured following ISO-1798 using a Lloyd Instruments LR10K Material Testing Machine; The transverse and longitudinal elongation at break (%) were measured following ISO-1798 using the same machine; Density was measured following ISO-845 using CHYO MJ300 Semi-analytical Balance. Compression deflection was measured following ISO 844 using the LR10K in compression mode.

TABLE 1

Mechanical properties of produced cross-linked polyethylene sheets

| PARAMETER | PHR CORK PARTICLES | | | |
|---|---|---|---|---|
| | 2.5 | 4 | 5 | 10 |
| Transverse Tensile Elongation at Break (%) | 108.4 | 105.8 | 93.1 | 62.5 |
| Transverse Tensile Strength (kPa) | 578.6 | 510.1 | 488.5 | 459.8 |
| Longitudinal Tensile Elongation at Break (%) | 132.7 | 92.2 | 96.1 | 50.9 |
| Longitudinal Tensile Strength (kPa) | 781.7 | 555.5 | 552.7 | 556.7 |
| Density (kg/m$^3$) | 89 | 65.8 | 68.6 | 81.34 |
| Compression deflection at 25% (kPa) | 119 | 78.3 | 85.0 | 100 |
| Compression deflection at 50% (kPa) | 214 | 163.8 | 173.7 | 206.7 |

The transverse tensile elongation and longitudinal tensile elongation refer to the % of elongation until break of the foam when pulled in transverse or longitudinal direction The transverse tensile and longitudinal strengths (kPa) are the maximum measured forces applied at the transverse or longitudinal directions, respectively, that is measured as the material sample breaks.

The density (kg/m$^3$) shows that for the first time, cork particles have been successfully added to a continuous highly expanded crosslinked polyolefin foam produced on a continuous process.

The compression deflection at 25% (kPa) is the measured force which is deflected by the foam after being compressed by 25% or 50%, respectively, to its ambient thickness The values presented in Table 1 show that polyolefin based foams embedded with cork particles, exhibit physical properties compatible with requirements needed for the various applications suggested herein such as in underlayment.

We claim:

1. A sheet of polymeric foam comprising:
   (a) a chemically cross-linked, closed-cell, foam comprising at least one polyolefin; and
   (b) cork particles dispersed within said sheet of polymeric foam;
   wherein the cork particles have an average diameter between 500 um and 2000 um,
   wherein the sheet of polymeric foam comprises 1 to 15 parts of the cork particles per 100 parts of the at least one polyolefin;
   wherein the cork particles are homogeneously dispersed over entire cross-section of the sheet of the polymeric foam;
   wherein the sheet of polymeric foam:
     (i) has a specific gravity of between 40-250 kg/m$^3$;
     (ii) is essentially free of visible perforations; and
     (iii) has an average diameter of the closed cells of between 500 μm and 3500 μm.

2. The sheet of polymeric foam of claim 1, comprising a thickness of between 0.5-25 mm.

3. The sheet of polymeric foam of claim 1, comprising a continuous sheet having a length of at least 2 m.

4. The sheet of polymeric foam of claim 1, comprising an average diameter of the closed cells of between 750 μm and 2500 μm.

5. The sheet of polymeric foam of claim 1, comprising one or more property selected from the group consisting of:
   (a) a compression set under constant force in air of between 5 and 50% measured after 24 hrs;
   (b) a melt index of between 0.3 g/10 min and 20 g/10 min;
   (c) a tensile strength of between 100 and 10000 KPA;
   (d) an elongation at break of between 30 and 500%;
   (e) a compressive stress (deflection at 25%) of between 20 and 2000 kPa; and
   (f) a compressive stress (deflection at 50%) of between 50 and 4000 kPa.

6. The sheet of polymeric foam of claim 1, wherein said polyolefin is a polyethylene.

7. The sheet of polymeric foam of claim 1, wherein said at least one polyolefin is a copolymer of ethylene and an alpha-olefin selected from of propene, butene, iso-pentene, hexene, iso-heptene and octene.

8. A sheet of polymeric foam comprising:
   (a) a chemically cross-linked, closed-cell, foam comprising at least one polyolefin; and
   (b) cork particles dispersed within said sheet of polymeric foam;
   wherein the cork particles have an average diameter between 500 um and 2000 um,
   wherein the sheet of polymeric foam comprises 1 to 15 parts of the cork particles per 100 parts of the at least one polyolefin;
   wherein the cork particles are homogeneously dispersed over entire cross-section of the sheet of the polymeric foam;
   wherein the sheet of polymeric foam has a specific gravity of between 40-250 kg/m$^3$ and is essentially free of visible perforations and has an average diameter of the closed cells of between 500 μm and 3500 μm,
   wherein the sheet of polymeric foam is produced as a continuous rolled sheet having a length of at least 2 m.

9. The sheet of polymeric foam of claim 8, comprising 1 to 10 parts of the cork particles per 100 parts of the at least one polyolefin.

* * * * *